(12) United States Patent
Johnson

(10) Patent No.: US 6,634,939 B2
(45) Date of Patent: Oct. 21, 2003

(54) VENTILATION SYSTEM AND METHOD

(76) Inventor: Thomas W. Johnson, 6300 Conroy St. NE., Prior Lake, MN (US) 55372

( * ) Notice: Subject to any disclaimer, the term of this patent is extended or adjusted under 35 U.S.C. 154(b) by 0 days.

(21) Appl. No.: 09/944,638

(22) Filed: Aug. 31, 2001

(65) Prior Publication Data

US 2003/0045228 A1 Mar. 6, 2003

(51) Int. Cl.[7] .............................................. F24F 11/047
(52) U.S. Cl. .................... 454/238; 126/299 D; 126/502; 454/61
(58) Field of Search .......................... 454/61, 238, 239, 454/256, 258, 343; 126/299 R, 299 D, 502

(56) References Cited

U.S. PATENT DOCUMENTS

| | | | |
|---|---|---|---|
| 2,130,995 A | * 9/1938 | Henney | 236/1 R |
| 4,105,015 A | 8/1978 | Isom | |
| 4,250,868 A | * 2/1981 | Frye | 126/502 |
| 4,407,185 A | * 10/1983 | Haines et al. | 165/234 |
| 4,497,242 A | 2/1985 | Moyer | |
| 4,552,059 A | 11/1985 | Potter | |
| 4,781,107 A | * 11/1988 | Nilsson | 165/246 |
| 4,903,685 A | 2/1990 | Melink | |
| 5,088,315 A | * 2/1992 | Johnson | 702/30 |
| 5,139,009 A | 8/1992 | Walsh | |
| 5,742,031 A | 4/1998 | Kelly et al. | |

OTHER PUBLICATIONS

Comet Industries brochure.
Loren Cook Company, Jan. 2001 VCR catalog.

* cited by examiner

Primary Examiner—Harold Joyce
(74) Attorney, Agent, or Firm—Merchant & Gould PC

(57) ABSTRACT

A ventilation system includes one or more exhaust fans and one or more make up air fans. Each fan has is driven by a motor operating at a constant speed. Each fan and motor are coupled by a torque converter, so that the torque applied to the fan is constant. Exhaust fan speed varies according to the ideal gas law, whereby the fan speed automatically varies in response to changes in system conditions, such as temperature and the associated changes in air density and resistance to the fan.

12 Claims, 3 Drawing Sheets

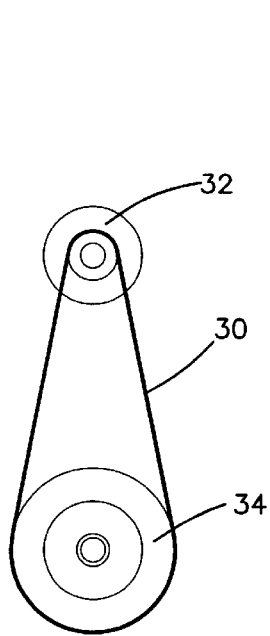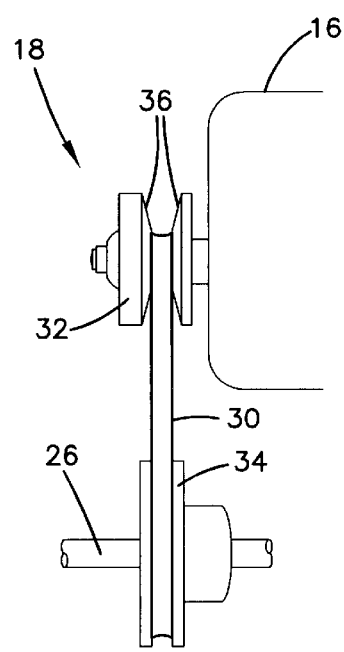
FIG. 4    FIG. 3
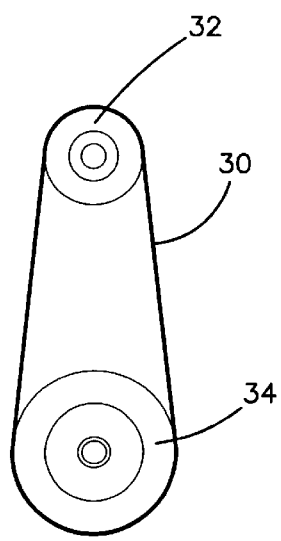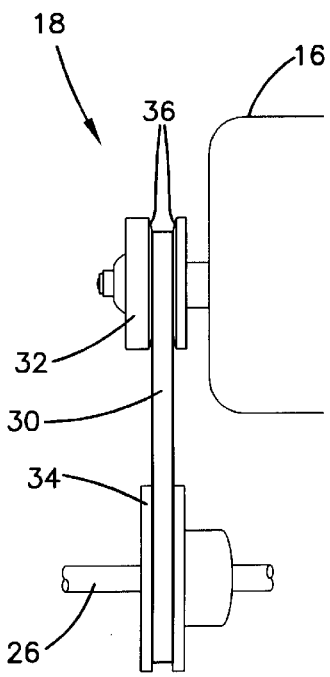
FIG. 6    FIG. 5

VENTILATION SYSTEM AND METHOD

BACKGROUND OF THE INVENTION

1. Field of the Invention

The present invention is directed to a ventilation system, and in particular to a ventilation system having either a fixed speed drive or a variable frequency drive, and an automatic torque converter intermediate the drive and the fan.

2. Prior Art

Many buildings, housings, cabinets and other enclosures require ventilation systems and have changing ventilation needs due to temperature changes. Ventilation systems come in a variety of configurations and are well known and widely used in kitchens and other areas that need to exhaust air and provide make-up air to replace the exhausted air. Many systems have been developed that control the ventilation rate by actuating fans and/or varying fan speed to respond to changes in temperature or pressure, often based upon electronic sensor input to a programmable logic unit (PLU) or other electronic device. Systems often use sensors and complicated controls varying motor speed to actuate and control motor speeds for varying the ventilation rates as the needs change.

A shortcoming with ventilation systems is due to the code requirements for designing the proper size fans, ducts, hoods and other ventilation equipment. The codes are based on criteria that may not actually match the physical processes of the area. Over-design of system components leads to excess exhaust air and also requires corresponding excess make-up air at some ventilation levels. Some systems may provide sufficient ventilation, but require greater energy to drive the system and over design for the actual needs. In addition, at higher operating speeds, such systems provide more torque than is required, placing a greater load on the motor, thereby shortening the life of the equipment.

It can be appreciated that a better understanding of the variability of thermal processes and their direct interrelationships with changes in pressure would lead to an optimized ventilation engineered design. The ideal gas law of physics should be used in determining ventilation rates. The ideal gas law is expressed by the equation pV=a constant for a fixed mass of gas. Therefore, pV=nRT, where p is the pressure, V is the volume of the gas such as air, n is the number of molecules (or moles) of the gas, R is the gas constant, and T is the absolute temperature, typically expressed in degrees Kelvin. It is appreciated that with this relationship, if the temperature increases, such as occurs through cooking or other heat generating activities, to maintain constant pressure, the number of molecules must be increased or the volume must be increased. Gas expands as it is heated in proportion to the temperature. Therefore, to maintain the same pressure, the ventilation rate must move a greater volume of air. However, the number of molecules being ventilated does not necessarily change. This can be explained by the expansion of the individual molecules as the temperature increases. Since the same number of molecules is ventilated, the mass occupying a greater volume moved remains constant; therefore the resistance of the gas and the force necessary to move them remains constant. To move a greater volume, fan speed is increased, while torque is kept constant. Conversely, a cooler gas is denser and provides greater resistance, so that if constant torque is provided, the fan will automatically slow down. With the prior art systems, an increase in motor speed also increases the torque, thereby overdriving the system.

It can be appreciated that a new and improved ventilation system and method for controlling ventilation fans is needed that overcomes the problems of the prior art. Such ventilation systems should provide for ventilation performance that matches the actual physical properties of the system. Such a system should provide fans driven at various speeds, but with a constant torque. The present invention addresses these, as well as other problems associated with ventilation systems and methods of controlling ventilation systems.

SUMMARY OF THE INVENTION

The present invention is directed to a ventilation method and system, and in particular to a ventilation system and ventilation control method based on the ideal gas law that utilizes constant torque to drive ventilating fans at varying speeds. The ideal gas law equation of state is expressed as:

$$pV=nRT$$

where p is the pressure, V is the volume of the gas, n is the number of moles or molecules of the gas, R is the gas constant, and T is the absolute temperature. As air behaves much like an ideal gas at room temperature, the ideal gas law can be applied to ventilation systems.

Using the absolute gas law as the basis for ventilating a cabinet, chamber, room or other area or enclosure, it can be appreciated that if substantially constant pressure is desired, as in many applications, the ventilation rate proportional to temperature. In other words, as the gas expands due to an increase in temperature, the volume of gas ventilated increases, but the actual number of gas molecules remains the same. As the gas expands, it becomes more buoyant and less dense, thereby exerting less resistance. Conversely, a fan driving the gas will have greater resistance at lower temperatures with a denser gas. Using this as the basis for driving the fan, if a torque converter is utilized, thereby maintaining constant torque on the fan, greater resistance results in a slower fan speed and thereby a lower ventilation speed. As the gas molecules are actually smaller, the same number of molecules is driven as at a higher temperature wherein the molecules are less dense and more buoyant. Higher temperatures increase gas volume, but also decrease resistance, so that the fan speed increases under constant driving torque.

Applying this to a real world ventilation system, such as a kitchen or a computer cabinet, the ventilation fan is driven by a motor with a transmission intermediate the fan and the motor. Once a base ventilation rate is determined for room temperature, the torque settings to drive the fan utilizing a motor of known size can be determined. With a torque converter applied, the torque to the fan is constant. Therefore, as the room temperature decreases, the speed of the fan slows, due to the less buoyant cooler, denser gas. When the temperature increases, the more buoyant lighter gas provides less resistance and the fan or fans speed up, moving a larger volume of air. In a preferred embodiment, torque converters are applied to the make-up air fans as well as exhaust air fans in a system to maintain a proper ventilation rate for the chamber. It can be appreciated that no controls are needed to turn on the system or actuate it in response to temperature changes as the torque converter automatically provides the proper driving force to each fan in response to temperature changes and the corresponding gas density and resistance changes due to the constant torque applied.

These features of novelty and various other advantages, which characterize the invention, are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

Referring to the drawings, wherein like reference letters and numerals indicate corresponding structure throughout the several views:

FIG. 3 shows an end view of a torque converter for the fan and drive of FIG. 2 in at a first speed;

FIG. 4 shows a side diagrammatic view of the torque converter of FIG. 3 at the first speed;

FIG. 5 shows an end view of the torque converter of FIG. 3 at a second speed; and FIG. 6 shows a side diagrammatic view of the torque converter of FIG. 5 at the second speed.

DETAILED DESCRIPTION OF THE PREFERRED EMBODIMENT

Figure 1:
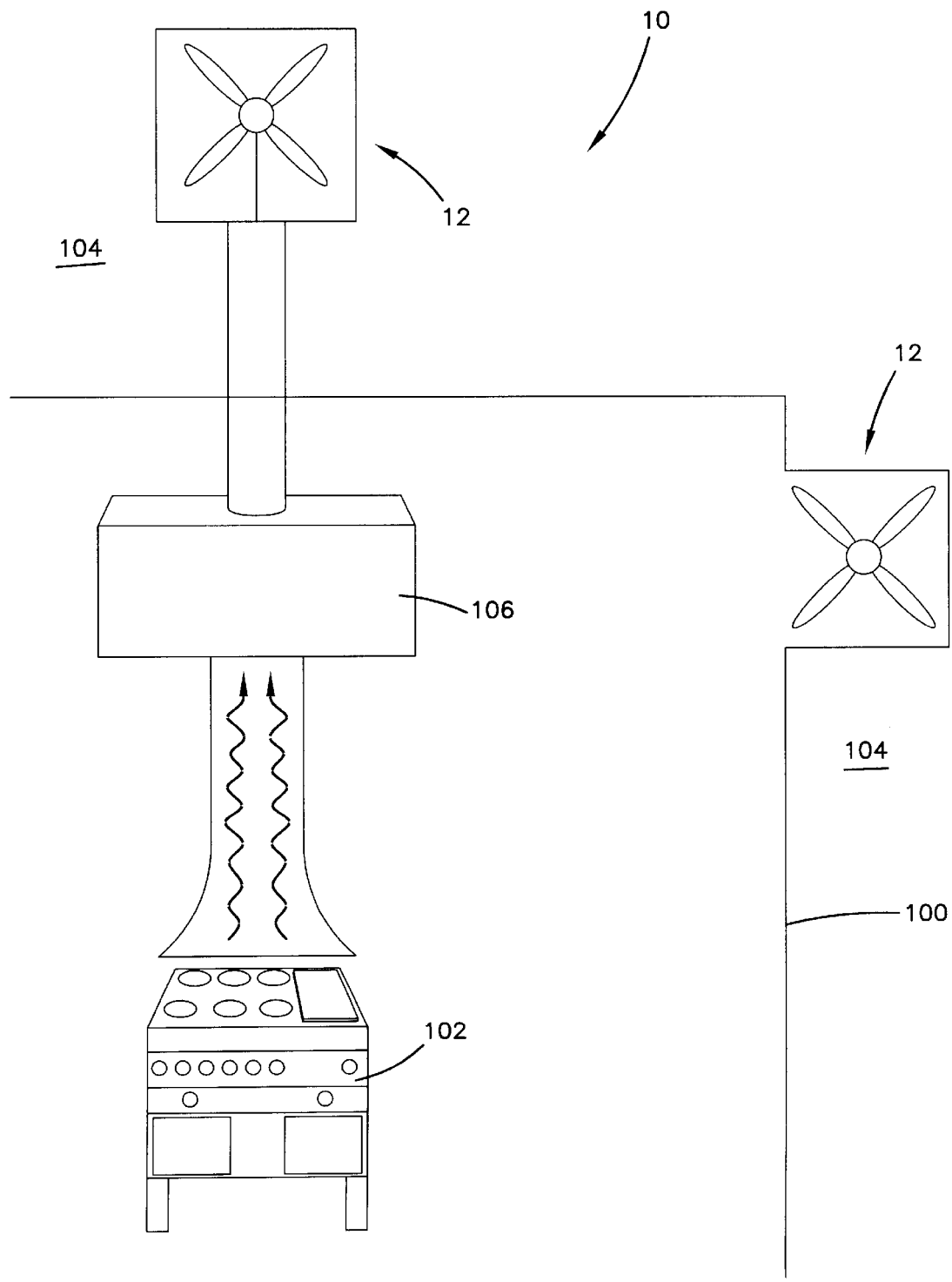
FIG. 1 shows a diagrammatic view of a ventilation system according to the principles of the present invention.

Referring now to the drawings, and in particular to FIG. 1, there is shown a ventilation system generally designated 10, according to the principles of the present invention. Ventilation system 10 functions on the principles of the ideal gas law. The ideal gas law can be expressed by the formula:

$$pV = nRT$$

where p is the pressure, V is the volume, n is number of moles or molecules of the gas, R is a universal gas constant, and T is the absolute temperature, usually in degrees Kelvin. The equation of state of an ideal gas is closely followed by atmospheric air under typical conditions and may be applied for controlling ventilation. For determining ventilation needs, the very small margin of error is within an acceptable tolerance. It can be seen by the equation of state for an ideal gas, that changes in pressure or volume will affect the temperature. Conversely, changes in temperature affect both the pressure and volume in a closed system. It can be appreciated as the temperature arises, the same volume of air becomes more buoyant and will accordingly rise. The resistance from the more buoyant, less dense air is also reduced. In typical commercial ventilation applications, the pressure is a variable that should be maintained at a substantially constant level.

The ideal gas law is used to create ventilation systems in a simple manner that optimizes ventilation resources without complicated controls. In the ventilation system 10 of the present invention that maintains constant torque, the speed of the fan will vary as resistance of the gas, due to changes in its buoyancy, varies. Therefore, as the gas is heated, it will expand, thereby becoming less dense. If constant torque is maintained, fan speed increases. This increased fan speed moves a greater volume of air through the ventilation system 10, but the number of molecules being moved is substantially constant, due to the change in volume and buoyancy. Conversely, if the gas is cooled, it becomes denser. This reduces its buoyancy and requires greater torque to move the denser air, thereby slowing the fan. Although the volume of air being moved by the fan is decreased at lower temperatures, the mass and the number of molecules moved is substantially constant, due to change in volume.

Referring now to FIG. 1, there is shown a typical environment needing ventilation. A chamber 100 has varying ventilation needs due to a heat source 102 that is activated from time to time. In the chamber 100 shown, a kitchen having a stove or grill is illustrated. However, it can be appreciated that other systems, having a heat source and ventilated chamber are equally adaptable to the present invention. Such systems include electronics cabinets, engine cooling systems covering a wide range of products and other residential and commercial building uses. Chamber 100 vents to another room 104, or to the atmosphere, depending on the application.

Figure 2:
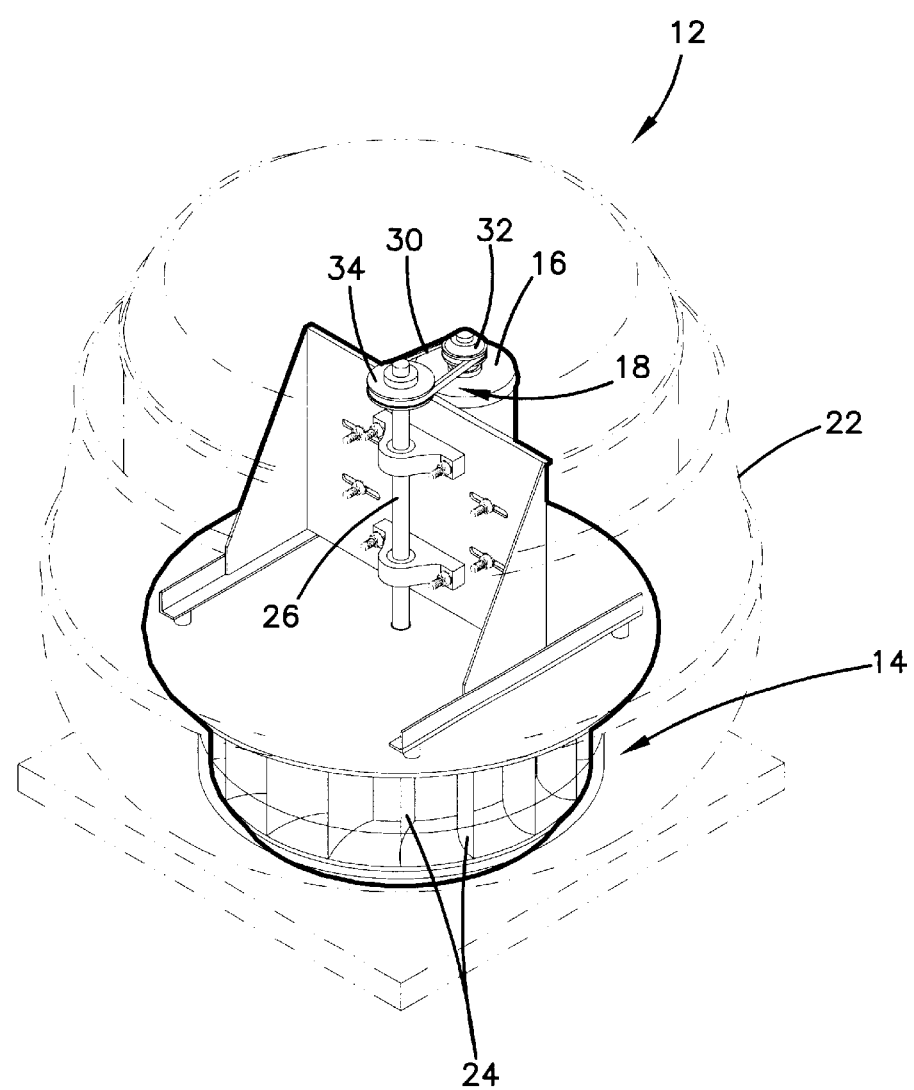
FIG. 2 shows a perspective view with portions broken away of a fan and drive for the ventilation system of FIG. 1.

The ventilation system 10 includes one or more fan assemblies 12. Each fan assembly includes a fan assembly 14, a motor 16 and a transmission 18, typically in the form of a cam actuator type torque converter, well known in the art, as shown in FIG. 2. It has been found that torque converters provided by Comet Industries of Richmond, Indiana are suitable for a typical ventilation system. The fan 14 includes a fan housing 22 including a fan element having blades 24 and shaft 26. A belt 30 connected to the motor 16 drives the shaft 26. The fan assembly 14 includes a transmission 18 including a drive pulley 32 and a driven pulley 34 cooperating with the belt to maintain constant torque. At least one of the pulleys 32 and 34 includes slightly tapering sides 36, shown as the driver pulley 32 in FIGS. 3 and 5. However, the driven pulley 34 or both pulleys could be configured with tapered sides 36 to function as a torque converter with effective diameters changing on either or both pulleys, as explained below. In response to changes in tension on the belt 30, the effective diameter of the pulleys 32 and 34 is modified as shown in FIGS. 3–6. As the tension on the belt at a pulley 32 or 34 increases, the cross-section of the belt 30 is deformed slightly and/or the sides of the pulley move relative to one another and the engagement position on the pulley is changed, thereby changing the effective rotational diameter. Greater tension moves the belt 30 inward on the pulley 32 or 34 while a decrease in tension allows the belt 20 to move outward. With this arrangement and with the motor 14 being driven at a constant speed, constant torque is maintained on the fan 14, although the speed of the fan 14 is varied.

Referring again to FIG. 1, multiple fan assemblies 12 may be utilized for both exhaust air and make-up air. The system 10 may include an interlock, such as well known in the art, between the exhaust and make up air assemblies. In a first condition, wherein the heat source 102 is not generating any heat, the ventilation system 10 is working at a low rate. The ambient air is substantially denser than heated air. Therefore, the resistance by the fan assemblies 24 is greater than that for heated air. The denser air provides increased resistance to the belt 30 on the drive pulley 32, resulting in the configuration shown in FIGS. 3 and 4. With the transmission 18 configured as shown in FIGS. 3 and 4, for relatively cold dense air, the fan 14 rotates at a relatively slow speed.

When the heat source 102 is activated, the air above the heat source 102 is heated, expands, and rises, as indicated by the arrows in FIG. 1. This increases the volume and the buoyancy of such gas and causes it to rise to an exhaust hood 106. The decreased density of the air causes less resistance to the fan 14. Since the motor 16 is rotated at a constant speed, the decreased resistance causes the fan 14 to speed up. The decreased resistance on the fan 14 and the driver pulley 32 causes the belt 30 to move outward along the angled surface 36. Under less tension, the belt 30 is positioned as shown in FIGS. 5 and 6. Torque is constant although the fan speed is increased from a greater effective diameter of the drive pulley 32. However, the volume of air moved is greater as the heated molecules are lighter and expanded. Although the volume is increased, the number of air molecules moved is maintained as the fan speed is increased. The pressure is maintained at a substantially constant rate by the transmission 18 that drives the fans 14 under a constant torque.

EXAMPLES

Example 1

A typical commercial kitchen might have a volume of 28,000 ft$^3$. At a no load ambient temperature (T) of 68° F. (293 K), a typical ventilation rate would be about 1600 CFM. The fan 14, such as model 165 V2B, manufactured by Loren Cook Company of Springfield, Mo. and driven by the motor 16 typically having ¼ horsepower, would rotate at a speed of 892 RPM.

Example 2

With the stove of Example 1 heated, the temperature rises to 200° F. (366 K).

As the static pressure and number of molecules of gas remain substantially constant with constant torque applied to the fan, the ventilation rate varies in proportion to the absolute temperature and the ventilation rate would be 2000 CFM. The fan 14 speed would increase proportionally to about 1115 RPM.

It can be appreciated from the examples, that although the ventilation rate increased, the pressure (p) and number of moles of air being ventilated (n) remain the same. The ventilation rate increase is proportional to the volume of air, which is proportional to the absolute temperature. Since the volume changes the resistance proportionally and the torque on the fan 14 is constant due to the torque converter 18, the ventilation system 10 automatically adjusts the ventilation rate without the need for further controls.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the fullest extent indicated by the broad general meaning of the terms in which the appended claims are expressed.

What is claimed is:

1. A method of ventilating, comprising:
   establishing a desired no load ventilation rate at an ambient temperature and a desired pressure and applying the ideal gas law;
   providing a fan, a motor, and a torque converter coupling the fan to the motor;
   driving the fan through the torque converter at no load to achieve the desired no load ventilation rate with the motor, whereby fan torque is constant.

2. A method according to claim 1, wherein the ventilation rate exhausts a constant number of air molecules.

3. A method according to claim 1, wherein make up air for a given temperature is constant.

4. A ventilation system comprising:
   a fan;
   a driver;
   a transmission connecting the driver to the fan, wherein the torque applied between the driver and the fan is constant and wherein the fan speed automatically varies in response to system requirements to maintain a ventilation rate determined by applying the ideal gas law.

5. A ventilation system according to claim 4, wherein the driver is driven at a constant speed.

6. A ventilation system according to claim 4, wherein the driver has constant resistance.

7. A ventilation system according to claim 4, wherein the transmission comprises a torque converter.

8. A ventilation system according to claim 7, wherein the torque converter comprises a cam actuator.

9. A ventilation system according to claim 4, wherein the fan speed varies as ambient pressure varies.

10. A ventilation system according to claim 4, wherein the driver comprises an electric motor driven at a constant speed drawing a constant current.

11. A method of ventilating, comprising:
    providing a fan, a motor and a transmission;
    determining a ventilation rate by selecting a desired pressure and temperature, and applying the ideal gas law;
    driving the fan with the motor through the transmission, whereby fan torque is constant.

12. A method of ventilating, comprising:
    providing a fan, a motor and a transmission;
    determining a ventilation rate by selecting a desired pressure and temperature;
    applying the ideal gas law and driving the fan with the motor through the transmission to maintain the ventilation rate.

* * * * *